US006231273B1

(12) United States Patent
Amieux

(10) Patent No.: US 6,231,273 B1
(45) Date of Patent: May 15, 2001

(54) FUEL PARTICLE SEPARATOR DISPOSED UPSTREAM FROM A BOILER, AND PROVIDED WITH AN ISOLATING VALVE MEMBER

(75) Inventor: Claude Amieux, Velizy-Villacoublay (FR)

(73) Assignee: Alstom France SA, Paris (FR)

(*) Notice: Subject to any disclaimer, the term of this patent is extended or adjusted under 35 U.S.C. 154(b) by 0 days.

(21) Appl. No.: 09/292,339

(22) Filed: Apr. 15, 1999

(30) Foreign Application Priority Data

Apr. 16, 1998 (FR) ........................................ 98 04 749

(51) Int. Cl.[7] .............................................. B65G 53/60

(52) U.S. Cl. ........................ 406/173; 406/174; 406/168

(58) Field of Search ................................ 406/173, 174, 406/168

(56) References Cited

U.S. PATENT DOCUMENTS 1,125,032 * 1/1915 Goodell .
2,112,359 3/1938 Crites .
2,992,858 * 7/1961 Pendleton .
3,776,600 * 12/1973 McLeod, Jr. ........................ 406/168
4,200,415 * 4/1980 Boring ................................ 406/173
4,473,326 * 9/1984 Oetiker ................................ 406/14
5,181,457 * 1/1993 Toshiyuki ........................ 406/174 X
5,562,366 * 10/1996 Paulson ................................ 406/12
5,845,782 * 12/1998 Depew ................................ 209/23

FOREIGN PATENT DOCUMENTS 0 282 722 A2 9/1988 (EP) .
0 372 402 A1 6/1990 (EP) .

* cited by examiner

*Primary Examiner*—Robert P. Olszewski
*Assistant Examiner*—Richard Ridley
(74) *Attorney, Agent, or Firm*—Sughrue, Mion, Zinn, Macpeak & Seas, PLLC

(57) ABSTRACT

A separator is disposed between a grinder and a boiler so as to select, on the basis of size, particles produced by grinding a fuel in the grinder and conveyed by a flow of air from the grinder to the separator, and then to the boiler. The separator extends in an axial direction and includes output compartments, each of which underlies a respective conveyor duct connecting the separator to the boiler. An isolating valve member is mounted to move inside the separator, and is moved in translation in the axial direction either to allow the flow to pass through all of the output compartments into the conveyor ducts or else to prevent said flow from passing therethrough. This isolating valve member makes it possible to close all of the output compartments together. In this way, it is possible to reduce the number of isolating valve members to the number of separators in a grinding installation, regardless of the number of conveyor ducts from each separator.

20 Claims, 4 Drawing Sheets

FUEL PARTICLE SEPARATOR DISPOSED UPSTREAM FROM A BOILER, AND PROVIDED WITH AN ISOLATING VALVE MEMBER

The invention relates to a separator disposed between a mill or grinder and a boiler so as to select, on the basis of size, particles produced by grinding a fuel in the grinder and conveyed by a flow of air from the grinder to the separator, and then to the boiler, which separator extends in an axial direction and includes output compartments, each of which underlies a respective conveyor duct connecting the separator to the boiler.

BACKGROUND OF THE INVENTION

Such a separator is used in particular for separating coal particles and for feeding the boiler with particles whose size is smaller than a reference size. The particles whose size exceeds the reference size are recycled to the grinder to be ground again with the coal feedstock.

The particles are conveyed from the grinder to the separator and then to the boiler by a flow air channelled by conveyor ducts. It is known that the hearth of the boiler can be fed via a plurality of ducts. For this reason, the separator commonly includes output compartments, each of which underlies a respective conveyor duct connecting the separator to the boiler.

In existing grinding installations, provision is made to isolate the boiler from the separator by disposing isolating gates on all of the pipes, preferably at the outlets from the separator. In known manner, each gate operates with an air barrier at a pressure that is higher than the pressure upstream and downstream from the gate in the duct in which it is mounted, so that it closes with complete airtightness.

The conveyor ducts connecting the separator to the boiler are closed during certain operations.

However, the use of one isolating gate for each conveyor duct is costly compared with the grinding installation as a whole. The proportionally high cost of isolating the ducts results from the unit cost of a gate, which includes implementing sealing by means of an air barrier, and from the number of gates per grinding installation.

OBJECTS AND SUMMARY OF THE INVENTION

An object of the invention is to reduce the cost of isolating conveyor ducts that connect a fuel particle separator to a boiler in a grinding installation.

The basic idea of the invention is to reduce the number of gates.

To this end, the invention provides a separator disposed between a grinder and a boiler so as to select, on the basis of size, particles produced by grinding a fuel in the grinder and conveyed by a flow of air from the grinder to the separator, and then to the boiler, which separator extends in an axial direction and includes output compartments, each of which underlies a respective conveyor duct connecting the separator to the boiler, wherein an isolating valve member is mounted to move inside the separator, and is moved in translation in the axial direction either to allow the flow to pass through all of the output compartments into the conveyor ducts or else to prevent said flow from passing therethrough.

The isolating valve member makes it possible for the conveyor ducts mounted on the output compartments of the separator to be closed together. In this way, the number of isolating valve members is reduced to the number of separators in the grinding installation, regardless of the number of conveyor ducts from each separator.

Preferably, the isolating valve member is secured to a valve member tube which communicates with a pressurized enclosure disposed outside the separator.

In a first advantage of the invention, the isolating valve member has two conical blades spaced apart by spacers and secured to the valve member tube which is provided with openings disposed between the two spaced-apart blades to enable barrier air to pass through and thus to put the valve member under higher pressure than the output compartments, thereby guaranteeing complete airtightness between the ducts and the separator.

In a second advantage of the invention, the isolating valve member has two conical blades spaced apart by spacers and secured to the valve member tube which is provided with openings at the base of one of the two blades to enable barrier air to pass through and thus to put the isolating valve member under higher pressure than two adjacent output compartments, thereby guaranteeing complete airtightness between the two corresponding ducts.

BRIEF DESCRIPTION OF THE DRAWINGS

Other characteristics and advantages of the invention will appear on reading the description of an embodiment shown by the drawings, in which.

MORE DETAILED DESCRIPTION

Figure 1A:
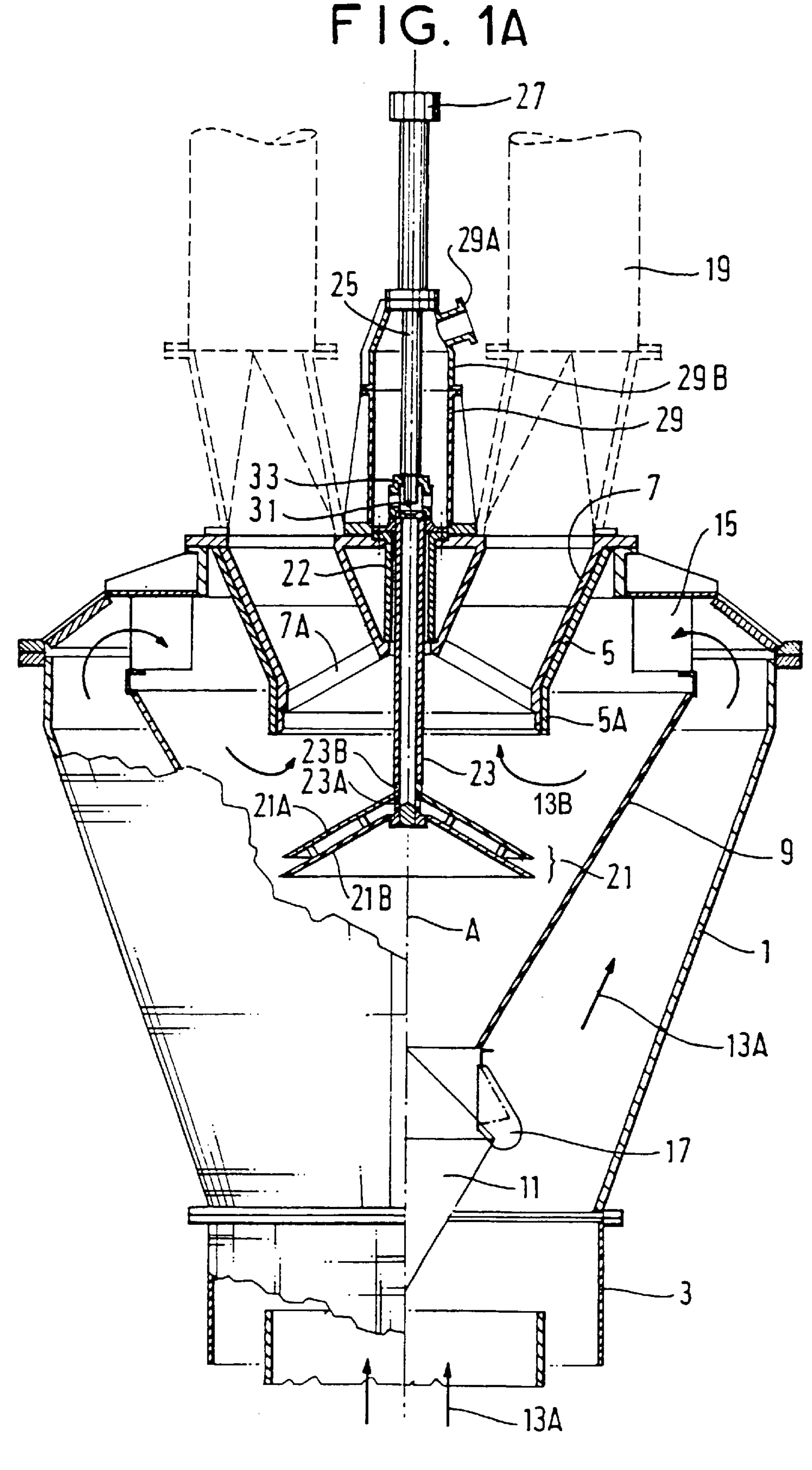
FIG. 1A is a section view of a separator in which an isolating valve member mounted to move in translation in an axial direction of the separator occupies an open position.

As shown in FIG. 1, a separator includes a substantially frustoconical separator body 1 which extends in an axial direction A. In a grinding installation (not shown), the separator is disposed vertically, its bottom communicates with a grinder via an input compartment, and its top communicates with a boiler via a distribution box 5 which comprises, for example, four output compartments 7 disposed symmetrically about the axis A of the separator 1.

The separator is designed to select, on the basis of size, coal particles obtained by grinding the fuel in the grinder and conveyed by a flow of air from the grinder to the separator and then to the boiler. It includes an input cone 11 disposed under inner walls 9 for directing the incoming flow 13A towards the top of the separator 1. Fineness flaps 15 select, on the basis of size, particles conveyed by the flow. Those whose size is smaller than a reference size set by the flaps are entrained by an upward flow 13B channeled by the output compartments 7 of the distribution box 5, while the others flow down under gravity along the inner walls 9 and then into the input cone 11. Flaps 17 mounted on the input cone direct the particles towards the input compartment 3.

The grinder and the separator communicate via a double-walled conveyor duct for conveying the recycled particles at the periphery of the duct, and the initial flow of air and of particles in the center of the duct.

Figure 1B:
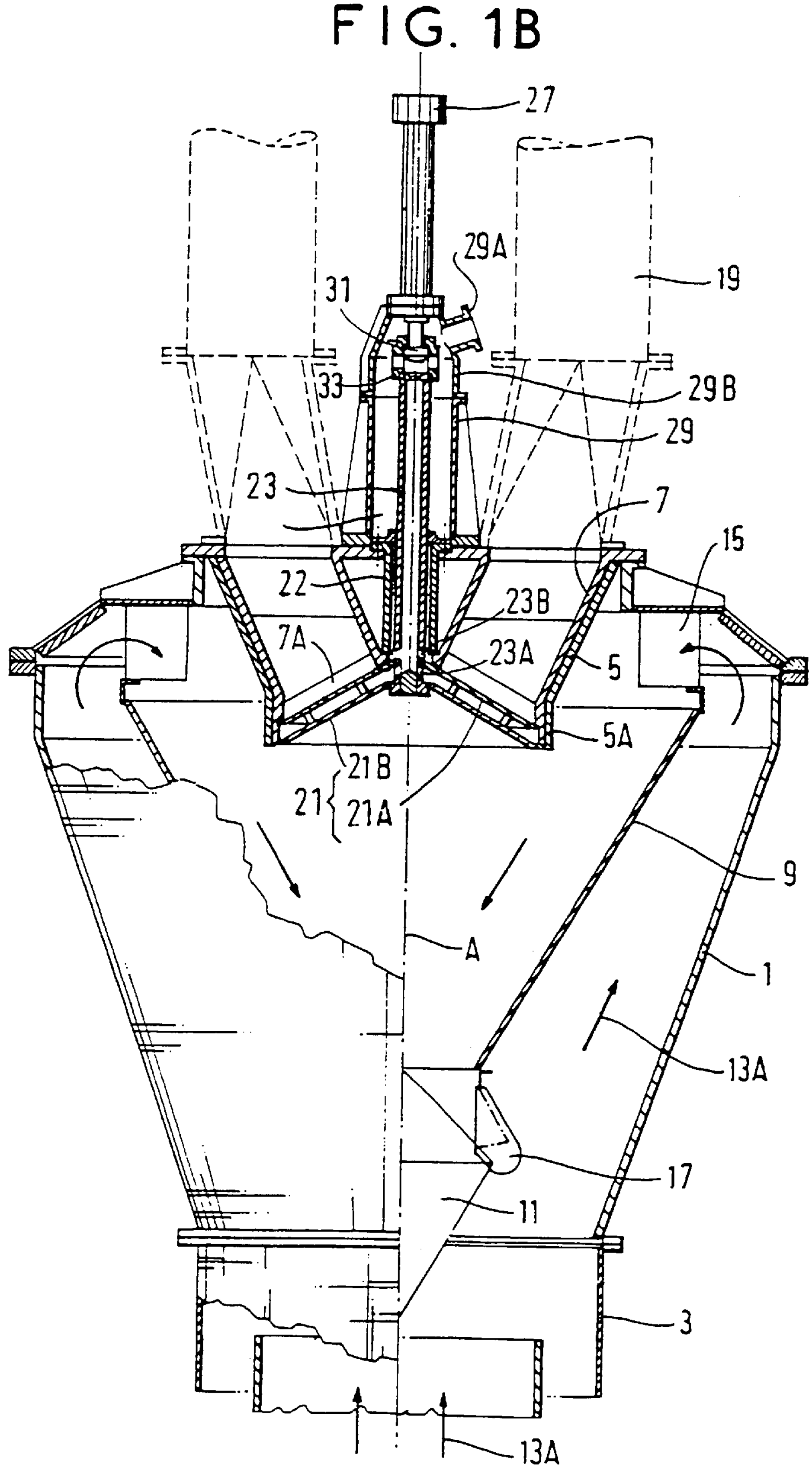
FIG. 1B is a section view of the FIG. 1A separator in which the isolating valve member occupies a closed position.

The separator and the boiler communicate via four conveyor ducts 19 shown in dashed lines in FIGS. 1A and 1B, each of which is fixed to an output compartment 7 of the distribution box 5. As indicated above, the four ducts serve to feed the hearth of the boiler at four distinct points.

In the invention, an isolating valve member 21 is moveably mounted inside the separator 1, and is moved in translation in the axial direction A either to allow the flow of air and of particles to pass through all of the output compartments 7 underlying respective ones of the conveyor ducts 19, or else to prevent said flow from passing therethrough.

In the example shown in FIGS. 1A and 1B, the isolating valve member 21 is conical in shape so as to close off all of the output compartments 7 by bearing both against the base 5A of the distribution box 5 and against the four partition edges 7A between the four output compartments 7.

In this way, by moving the isolating valve member from an open position (FIG. 1A) to a closed position (FIG. 1B), it is possible to close all four of the output compartments together, independently of the number of conveyor ducts connecting the separator to the boiler.

A shown in FIGS. 1A and 1B, the isolating valve member 21 is secured to a valve member tube 23 which is caused to slide in a guide bearing 22 in the axial direction A by means of a control rod 25 actuated by a pneumatic actuator 27 mounted outside the separator 1. In this way, a single pneumatic actuator suffices to move the isolating valve member in order to open or to close the output compartments 7. Savings are thus made in terms of the means required.

The valve member tube 23 communicates with a pressurized enclosure 29 which is disposed outside the separator 1 so as to communicate easily with a source of barrier air via an inlet 29A.

In the example shown in FIGS. 1A and 1B, the pressurized enclosure 29 extends in the axial direction A, and it is fixed to the distribution box 5 so as to serve as a support for the pneumatic actuator 27. The control rod 26 is guided by the guide bearing 22.

In a first advantage of the invention, the isolating valve member 21 has two conical blades 21A and 21B spaced apart by spacers and secured to the valve member tube 23. The valve member tube is provided with openings 23A disposed between the two spaced-apart blades 21A and 21B so as to provide first passageways for the barrier air injected by the pressurized enclosure 29.

Figure 2:
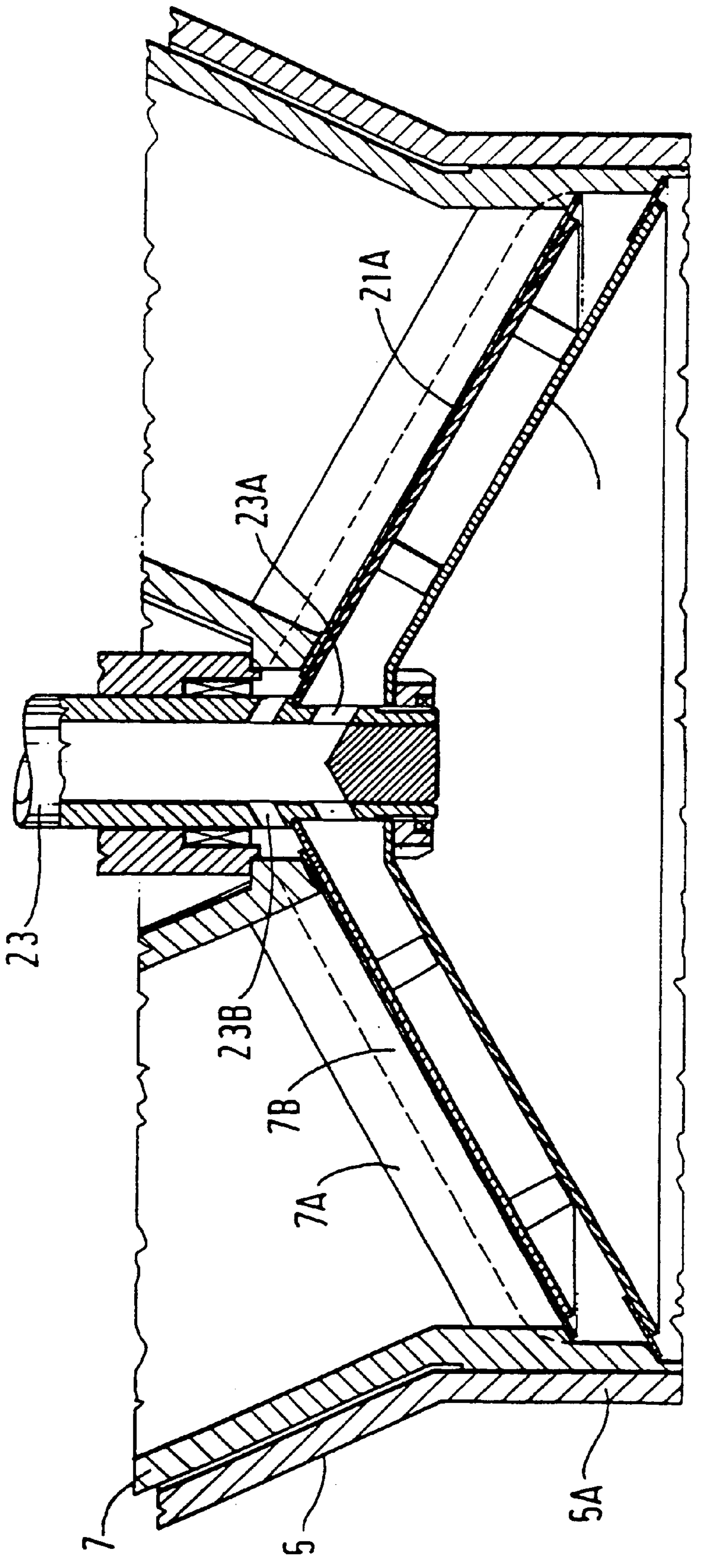
FIG. 2 is a section view of the isolating valve member with two blades spaced apart by spacers and secured to a valve member tube.

FIG. 2 shows the isolating valve member 21 in the closed position. The barrier air injected by the pressurized enclosure 29 via the valve member tube 23 and via the openings 23A and 23B creates high pressure between the spaced-apart blades 21A and 21B, which high pressure is higher than the pressure in the separator 1. By way of example, the high pressure is equal to 1,000 Pa. In this way, any flow between the isolating valve member 21 and the base 5A of the distribution box 5 is prevented, thereby guaranteeing total airtightness between the separator and all of the conveyor ducts 19.

In a second advantage of the invention, the valve member tube 23 is provided with openings 23B at the base of one of the two spaced-apart blades (21A) so as to provide second passageways for the barrier air injected by the pressurized enclosure 29.

Figure 3:
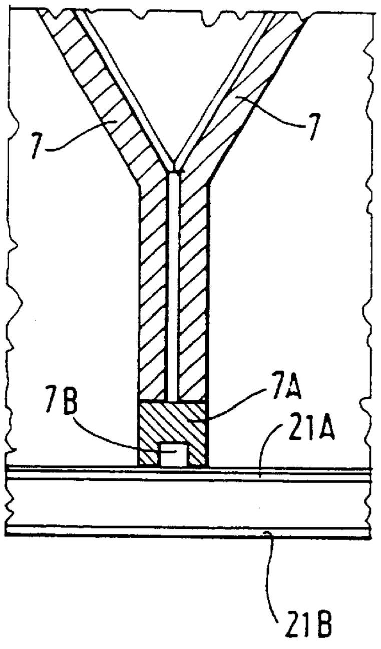
FIG. 3 is a fragmentary section view of two adjacent output compartments in the separator.

FIGS. 2 and 3 show the isolating valve member in the closed position. The barrier air injected by the pressurized enclosure 29 via the valve member tube 23 and via the openings 23A and 23B creates high pressure in a groove 7B in each partition edge 7 between two adjacent output compartments 7. The high pressure which is higher than the pressure in the conveyor ducts 19 is of the same order of magnitude as indicated above, i.e., 1,000 Pa for example. In this way, any flow between two adjacent compartments is prevented, thereby guaranteeing total airtightness between the two conveyor ducts 19 mounted on the two output compartments.

In a third advantage of the invention, a barrier air sealing valve member 31 is secured to the control rod 25 so as to isolate the valve member tube 23 from the pressurized enclosure 29 when the isolating valve member 21 is in the open position.

The barrier air sealing valve member 31 is formed at the end of the control rod 25, and it is mounted to slide inside a cylinder 33 secured to the valve member tube 23. The cylinder 33 is provided with openings 33A and 33B to enable barrier air to pass from the pressurized enclosure 29 to the inside of the valve member tube 23.

Figure 4A:
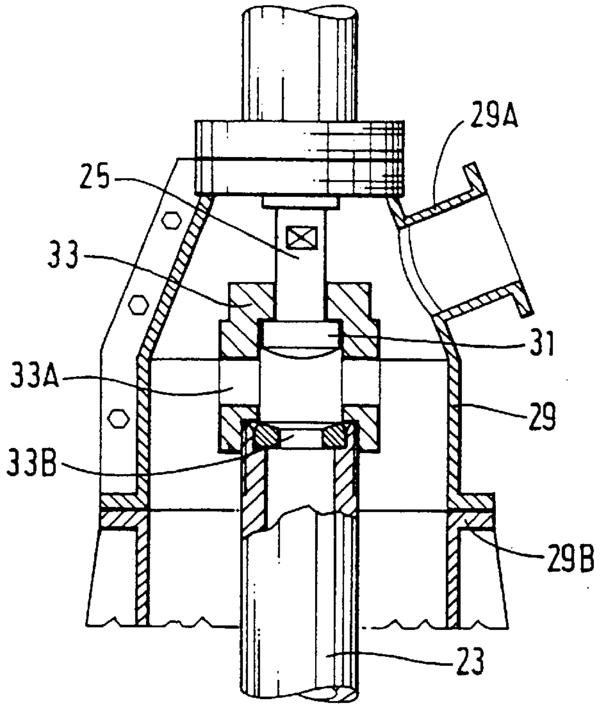
FIG. 4A is a fragmentary section view of a barrier air sealing valve member in a pressurization enclosure of the separator when the isolating valve member is in the closed position.

FIG. 4A shows the sealing valve member 31 in the open position, and the barrier air can be directed towards the isolating valve member 21. It is in high abutment against the cylinder 33 by being supported by the control rod 25 which has moved under the action of the pneumatic actuator 27 so as to place the isolating valve member 21 in the closed position. The cylinder 33 is retained against the force from the sealing valve member 31 by the valve member tube 23 and by the isolating valve member 21 which bears against the guide bearing 22.

Figure 4B:
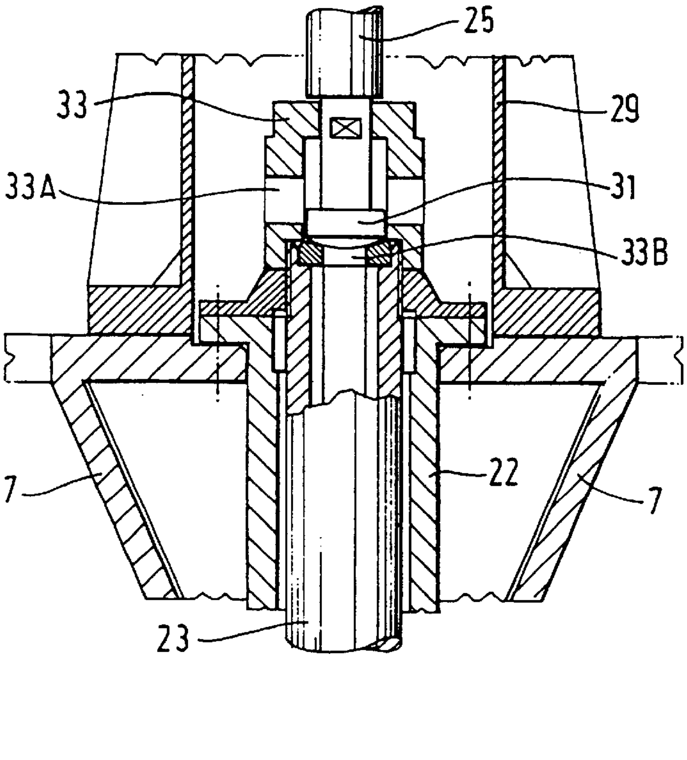
FIG. 4B is a fragmentary section view of the FIG. 4A sealing valve member when the isolating valve member is in the open position.

FIG. 4B shows the barrier air sealing valve member 31 in the closed position. It is pressed into abutment against the valve member tube 23 by the control rod 25 which has moved under the action of the pneumatic actuator 27 so as to place the isolating valve member 21 in the open position.

The sealing valve member 31 prevents barrier air from passing into the valve member tube 23 when the isolating valve member 21 is in the open position, and it makes it possible for the barrier air to be used only when the isolating valve member 21 is raised into the closed position. In this way, savings are made in the barrier air required to obtain complete airtightness between the separator and the output compartments.

What is claimed is:

1. A separator, comprising:

a separator body adapted to be disposed between a grinder and a boiler, said separator body having a conveyor structure adapted to select, on the basis of size, particles of a certain maximum size by forcing said particles to travel in one direction using forced air, and allowing particles of a certain minimum size to travel in another direction under the force of gravity, all of said particles having been produced by grinding a fuel in the grinder and conveyed by a flow of air from the grinder to the separator, and then to the boiler;

wherein said separator extends in an axial direction and further includes output compartments, each of which underlies a respective conveyor duct connecting the separator to the boiler; and wherein said separator further includes an isolating valve member mounted to move inside the separator in translation in the axial direction either to allow the flow to pass through all of the output compartments into the conveyor ducts or else to prevent said flow passing therethrough.

2. A separator according to claim 1, in which the isolating valve member is secured to a valve member tube coupled to a control rod for movement in the axial direction, said control rod actuated by an actuator mounted outside the separator.

3. A separator according to claim 2, in which the valve member tube communicates with a pressurized enclosure disposed outside the separator and having an inlet for communicating with a source of barrier air.

4. A separator according to claim 3, in which the isolating valve member has two conical blades spaced apart by spacers and secured to the valve member tube, said valve member tube is provided with openings disposed between the two spaced-apart blades.

5. A separator according to claim 3, in which the valve member tube is provided with openings at the base of one of the two spaced-apart blades of the valve member.

6. A separator according to claim 3, further comprising a barrier air sealing valve member secured to the control rod so as to be actuated by the control rod, wherein the barrier air sealing member operates to isolate the valve member tube from the pressurized enclosure when the isolating valve member is in the open position.

7. A separator according to claim 6, in which the sealing valve member slides inside a cylinder secured to the valve member tube.

8. A separator according to claim 7, in which the cylinder is provided with openings enabling barrier air to flow from the pressurized enclosure to the inside of the valve member tube.

9. The separator according to claim 1, wherein the isolating valve member is secured to a valve member tube coupled to a control rod for movement in the axial direction, and wherein the value member tube communicates with a pressurized enclosure having an inlet for communicating with a source of barrier air.

10. The separator according to claim 9, wherein the isolating valve member has two conical blades spaced apart by spacers and secured to the valve member tube, said valve member tube is provided with openings disposed between the two spaced-apart blades.

11. A separator according to claim 9, wherein the valve member tube is provided with openings at the base of one of the two spaced-apart blades of the valve member.

12. The separator according to claim 9, further comprising a barrier air sealing valve member secured to the control rod so as to be actuated by the control rod, wherein the barrier air sealing member operates to isolate the valve member tube from the pressurized enclosure when the isolating valve member is in the open position.

13. The separator according to claim 12, in which the sealing valve member slides inside a cylinder secured to the valve member tube.

14. The separator according to claim 13, in which the cylinder is provided with openings enabling barrier air to flow from the pressurized enclosure to the inside of the valve member tube.

15. A separator, comprising:

a separator body adapted to be disposed between a grinder and a boiler, said separator body having a conveyor structure adapted to select, on the basis of size, particles of a certain maximum size by forcing said particles to travel in one direction using forced air, and allowing particles of a certain minimum size to travel in another direction under the force of gravity, all of the particles having been produced by grinding a fuel in the grinder and conveyed by a flow of air from the grinder to said separator, and then to the boiler;

wherein said separator extends in an axial direction and further includes an output compartment that underlies a conveyor duct connecting the separator to the boiler;

wherein said separator further includes an isolating valve member mounted to move inside said separator in translation in the axial direction either to allow the flow to pass through said output compartment into said conveyor duct or else to prevent said flow passing therethrough;

wherein said isolating valve member is secured to a valve member tube coupled to a control rod for movement in the axial direction, and wherein said value member tube communicates with a pressurized enclosure having an inlet for communicating with a source of barrier air; and wherein said isolating valve member has two conical blades spaced apart by spacers and secured to the valve member tube, said valve member tube provided with openings disposed between the two spaced-apart blades.

16. A separator, comprising:

a separator body adapted to be disposed between a grinder and a boiler, said separator body having a conveyor structure adapted to select, on the basis of size, particles of a certain maximum size by forcing said particles to travel in one direction using forced air, and allowing particles of a certain minimum size to travel in another direction under the force of gravity, all of the particles having been produced by grinding a fuel in the grinder and conveyed by a flow of air from the grinder to said separator, and then to the boiler;

wherein said separator extends in an axial direction and further includes an output compartment that underlies a conveyor duct connecting the separator to the boiler;

wherein said separator further includes an isolating valve member mounted to move inside said separator in translation in the axial direction either to allow the flow to pass through said output compartment into said conveyor duct or else to prevent said flow passing therethrough;

wherein said isolating valve member is secured to a valve member tube coupled to a control rod for movement in the axial direction, and wherein said value member tube communicates with a pressurized enclosure having an inlet for communicating with a source of barrier air; and wherein the valve member tube is provided with openings at the base of one of the two spaced-apart blades of the valve member.

17. The separator according to claim 15, further comprising a barrier air sealing valve member secured to the control rod so as to be actuated by the control rod, wherein the barrier air sealing member operates to isolate the valve member tube from the pressurized enclosure when the isolating valve member is in the open position; and wherein the sealing valve member slides inside a cylinder secured to the valve member tube.

18. The separator according to claim 17, in which the cylinder is provided with openings enabling barrier air to flow from the pressurized enclosure to the inside of the valve member tube.

19. The separator according to claim 16, further comprising a barrier air sealing valve member secured to the control rod so as to be actuated by the control rod, wherein the barrier air sealing member operates to isolate the valve member tube from the pressurized enclosure when the isolating valve member is in the open position; and wherein the sealing valve member slides inside a cylinder secured to the valve member tube.

20. The separator according to claim 19, in which the cylinder is provided with openings enabling barrier air to flow from the pressurized enclosure to the inside of the valve member tube.

* * * * *